Patented Oct. 11, 1938

2,132,810

UNITED STATES PATENT OFFICE 2,132,810

PROCESS FOR THE MANUFACTURE OF COLORED PLASTIC MASSES

Fritz Straub and Hans Mayer, Basel, Switzerland, assignors to firm of Society of Chemical Industry in Basle, Basel, Switzerland No Drawing. Application August 5, 1935, Serial No. 34,858. In Switzerland August 13, 1934

2 Claims. (Cl. 134—79)

It has been found that dyed plastic masses can be produced by incorporating into these masses by mechanical treatment complex metal compounds of arylmethane dyestuffs sparingly soluble to insoluble in lacquer solvents.

Complex metal compounds of arylmethane-dyestuffs which are sparingly soluble or insoluble in lacquer solvents are, for example, the complex chromium-, iron-, cobalt-, nickel-, aluminium-, manganese-, zinc-, vanadium- or titanium-compounds, or compounds, containing two or more of these metals, of arylmethane dyestuffs of the diphenyl-, dinaphthyl-, triphenyl- and trinaphthyl-methane-series.

These arylmethane-dyestuffs may contain one, two or more lake-forming groups, that is to say hydroxyl-groups in ortho-position to the carboxyl-group. Such products are, for instance, the dyestuffs which are produced by oxidation of the condensation product from 1 mol. of an aromatic aldehyde (which may contain as substituents nitro-, alkyl-, sulfo- and alkoxy-groups or halogen, for instance chlorine or bromine) with 2 mols of an aromatic ortho-hydroxycarboxylic acid, for instance 2-hydroxybenzene-1-carboxylic acid or 3-methyl-2-hydroxybenzene-1-carboxylic acid; also the dyestuffs which can be made by the action of formaldehyde and an oxidizing agent on ortho-hydroxybenzoic acids; finally, the dyestuffs which can be made by condensation of 1 mol. of a benzotrichloride and 2 mols of an ortho-hydroxynaphthoic acid, or by the action of carbon tetrachloride on ortho-hydroxyarylcarboxylic acids in alkaline solution and in presence of copper.

The complex metal compounds may be made by treatment of the arylmethane dyestuffs, individually or in admixture with each other, with an agent yielding metal in acid, neutral or alkaline medium in an open vessel or under pressure, and in presence or absence of additions, such as salts of organic or inorganic acids or free acids (for example, sodium formate, benzene sulfonic acid, naphthalene sulfonic acids, sodium acetate, common salt, Glauber's salt, formic acid, acetic acid, tartaric acid).

As plastic masses or solutions of them (for example in water, an alcohol, a glycol, a ketone, such as acetone, a hydrocarbon, such as benzene or toluene, an ether, an ether alcohol or an ester, such as glycolalkyl ether or butylacetate, drying or hardening oils, or mixtures of solvents, such as are usual for making nitrocellulose lacquers) which may be colored with the complex metal compounds there come into question, for instance, those composed of cellulose or a natural or artificial resin as the basis. Materials of a cellulose basis are, for example, lacquers and plastic masses from nitro-, acetyl-, ethyl- or benzyl-cellulose, as well as other esters and ethers of cellulose. Masses of the natural resin basis are varnish resins, such as copal, amber, shellac, colophony or wax, such as carnauba wax or ozokerite; also natural polymerization products, such as caoutchouc, balata, or guttapercha. Masses having artificial resin basis may be made for example, from the condensation products of aldehydes with phenols or with aromatic amines, for instance aniline or with acetamide, such as urea, thiourea and their derivatives, or arylsulfamides; also the condensation products of polybasic acids with polyhydric alcohols, for instance glyptals and alkyde resins, polymerization products, for instance vinyl-, styrene- and acrylic acid-resins; finally casein.

The dyestuffs are incorporated in the plastic masses in such a manner that solutions of the plastic masses are ground with the dyestuffs in a ball mill or a roller mill, or that the plastic masses as such are treated with the dyestuffs in roller devices or kneading devices, for example in kneading apparatuses or roller mills. In these operations suitable substances may be added, for example a higher fatty acid, a filling material like barium sulfate, zinc oxide or titanium dioxide, as well as a softening agent or plastifier, such as triphenylphosphate, tricresylphosphate, glycerine or castor oil.

The dyed plastic masses which according to the intensity of the treatment in the ball mills or roller mills or in the roller or kneading devices may be of good covering quality, transparent or lustrous or opaque, may be of very different tints which are very fast, particularly to light, in spite of the fact that they are derived from arylmethane dyestuffs which are otherwise not fast to light.

The following examples illustrate the invention, the parts being by weight:—

Example 1

5 parts of the aluminium compound of the dyestuff Naphthochrome Green G (Schultz, Farbstofftabellen, 7th edition, Vol. I, No. 851) of the formula

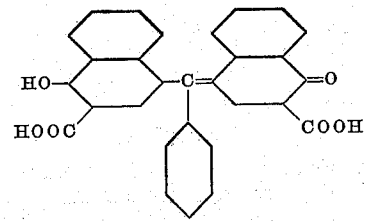

are ground with 15 parts of tricresylphosphate and 5 parts of butyl acetate for 4 hours in a roller mill. 50 parts of commercial nitrocellulose lacquer are now added and grinding continued until homogeneity is obtained. The paste thus produced is diluted with 430 parts of nitrocellulose lacquer. On a suitable support (metal, glass, leather, wood, Celluloid, silk, cotton or the like) there is produced a powerful, bluish-green, glazed coating of very good fastness to light.

The complex aluminium compound used in this example may be made as follows:—

50 parts of Naphthochrome Green G are heated to boiling with 500 parts of water, 17 parts of crystallized aluminium sulfate are added and the mixture is boiled in a reflux apparatus for 4 hours. The aluminium compound is completely precipitated; it is filtered and washed with water. When dry it is a vivid green powder, insoluble in water and organic solvents and soluble in concentrated sulfuric acid to a greenish grey-blue solution.

If in this example 5 parts of the aluminium compound of the dyestuff Naphthochrome Azurine B (Schultz, Farbstofftabellen, 7th, edition, Vol. I, No. 852) of the formula

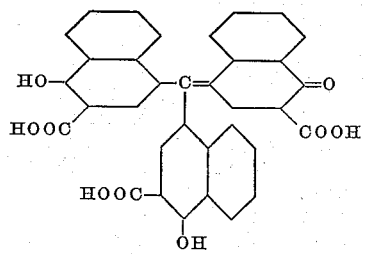

are used, there is obtained a reddish-blue coating of high purity and fastness to light.

*Example 2*

5 parts of nickel compound of the dyestuff Naphthochrome Azurine B are made into a paste with 20 parts of oil varnish in a roller mill, a further 50 parts of oil varnish are added after 4 hours and when a homogenous mixture has been produced this is diluted with 430 parts of oil varnish. There is obtained a very powerful reddish-blue.

*Example 3*

5 parts of the aluminium compound of the dyestuff Eriochrome Azurol B (Schultz, Farbstofftabellen, 7th edition, Vol. I, No. 838) of the formula

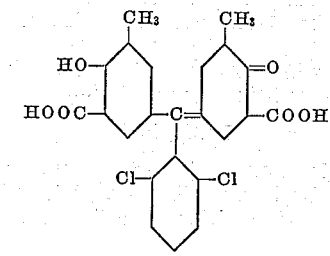

are incorporated as described in Example 2 with Bakelite lacquer (phenol-formaldehyde condensation product). There is obtained a powerful glazed greenish-blue.

*Example 4*

5 parts of the vanadium compound of the dyestuff Naphthochrome Azurine B are incorporated in a spirit lacquer as described in Example 2. The product yields, for example on tin foil, a reddish blue coating.

The vanadium compound used in this example may be made as follows:

12 parts of Naphthochrome Azurine B are heated to boiling with 200 parts of water, 4 parts of ammonium vanadate ($NH_4VdO_3$) are added and the whole is boiled in a reflux apparatus for 10 hours. After cooling, the separated vanadium compound of the dyestuff is filtered, washed and dried at a moderate temperature. There is obtained a dark blue powder, insoluble in water and organic solvents and soluble in concentrated sulfuric acid to a greenish-blue solution.

*Example 5*

5 parts of the copper compound of the dyestuff Naphthochrome Azurine B are made into a paste with 20 parts of acetylcellulose lacquer. 1 part of the paste is worked up in the kneading apparatus with 25 parts of acetylcellulose, 1.25 parts of titanium oxide, and the corresponding quantity of a suitable diluent, in the usual manner by kneading, rolling and pressing, to obtain a plastic mass. Pressed objects of a pure blue may be made therefrom.

*Example 6*

0.5 part of the copper compound of the dyestuff Eriochrome Azurol B are mixed, while dry, in a kneading apparatus with 2 parts of titanium oxide and 50 parts of a moulding powder having a basis of phenol-formaldehyde condensation product, for about 3 hours; the mixture is kneaded at 100° C. in the mixing roller, pulverized and moulded in the usual manner. Greyish-blue bodies are thus obtained.

The copper compound used in this example may be made as follows:

35 parts of Eriochrome Azurol B are heated to boiling in 500 parts of water and the mixture is boiled, with addition of 25 parts of crystallized copper sulfate, for 3 hours while stirring in a reflux apparatus. After cooling, the separated copper compound is filtered, washed and dried at a moderate temperature. There is obtained a red-blue powder, insoluble in water and organic solvents but soluble in concentrated sulfuric acid to a bright yellow-red solution.

*Example 7*

0.25 part of the aluminium compound of the dyestuff Eriochrome Azurol B are ground and mixed for 12 hours in a ball mill with 50 parts of a moulding powder made from a urea-formaldehyde condensation product, and the powder is pressed for 3 minutes at 145° C. There is thus obtained a blue-violet moulded object.

*Example 8*

0.1 part of the cobalt compound of the dyestuff Naphthochrome Azurine B are worked up in the manner described in Example 7 with 50 parts of the moulding powder used in Example 7 and 1 part of lithopone. The moulded bodies produced have a mauve tint.

*Example 9*

0.1 part of the copper compound from the dyestuff Naphthochrome Azurine B are rubbed with 2 parts of glycerine and then mixed with 100 parts of a mass ready for casting consisting of the condensation product having a basis of phenol-formaldehyde + phthalic acid-glycerine, and the mixture is then hardened. There is obtained a beautiful greenish-blue, translucent noble artificial resin.

*Example 10*

1 part of the dyestuff named in Example 9 is mixed dry with 99 parts of a moulding powder made from an aniline-formaldehyde condensation product. The mixture is ground, sifted and compressed for 10 minutes at a temperature of 160–165° C. and under a pressure of 200 kilos per sq. cm. The moulded form is deep black.

The following table contains a number of other suitable complex metal compounds of arylmethane dyestuffs and indicates their application.

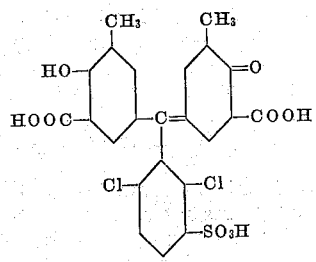

No. 28

| No. | Parent dyestuff | Metal | Color in nitro-cellulose lacquer |
|---|---|---|---|
| 1 | Condensation product from 1 mol. para-dimethylaminobenzaldehyde and 2 mol. 3-methyl-2-hydroxy-1-benzoic acid, oxidized. | Nickel | Brownish violet. |
| 2 | ---do--- | Zinc | Reddish violet. |
| 3 | ---do--- | Cobalt | Violet. |
| 4 | ---do--- | Copper | Brownish violet. |
| 5 | ---do--- | Aluminium | Reddish violet. |
| 6 | ---do--- | Chromium | Brown violet. |
| 7 | Eriochrome Azurol B | Copper | Reddish blue. |
| 8 | ---do--- | Zinc | Violet. |
| 9 | ---do--- | Nickel | Reddish blue. |
| 10 | ---do--- | Cobalt | Do. |
| 11 | ---do--- | Aluminium | Pure blue. |
| 12 | ---do--- | Chromium | Greenish blue. |
| 13 | Naphthochrome Azurine B | Iron | Grey blue. |
| 14 | ---do--- | Manganese | Greyish blue. |
| 15 | ---do--- | Zinc | Reddish blue. |
| 16 | ---do--- | Cobalt | Pure blue. |
| 17 | ---do--- | Nickel | Reddish blue. |
| 18 | ---do--- | Chromium | Greenish blue. |
| 19 | ---do--- | Wolfram | Grey blue. |
| 20 | ---do--- | Vanadium | Reddish blue. |
| 21 | Naphthochrome Green G | Chromium | Dark green. |
| 22 | ---do--- | Copper | Bluish green. |
| 23 | ---do--- | Cobalt | Blue green. |
| 24 | ---do--- | Nickel | Do. |
| 25 | ---do--- | Iron | Black green. |
| 26 | Condensation product from tetramethyl diaminobenzhydrol and salicylic acid, oxidized. | Chromium | Violet. |
| 27 | Condensation product from tetramethyl diaminobenzhydrol and 1:2-hydroxy-naphthoic acid, oxidized. | ---do--- | Blue. |
| 28 | Condensation product from 2:6-dichlorbenzaldehyde-3-sulfonic acid and orthocresotinic acid, oxidized. | ---do--- | Do. |
| 29 | Condensation product from 6-chlorbenzaldehyde-2:4-disulfonic acid, and ortho-cresotinic acid, oxidized. | ---do--- | Do. |

In the foregoing table the parent dyestuffs Nos. 1, 26, 27, 28 and 29 correspond to the following formulas:

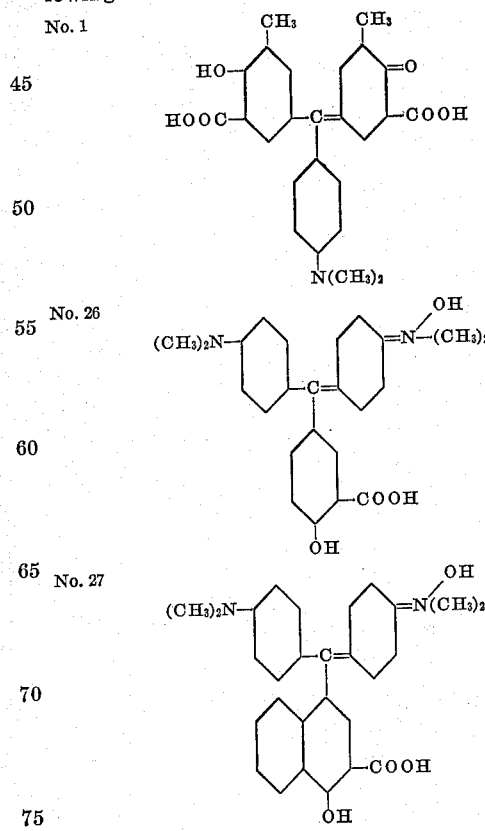

No. 29

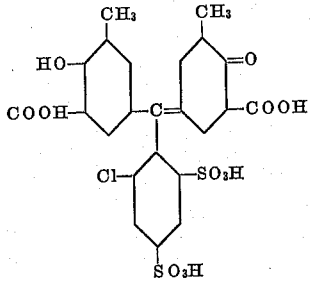

The dyestuffs 1–6 of the table are made as follows:—

30 parts of dyestuff are heated to boiling in 400 parts of water and after addition of 14.1 parts of crystallized nickel sulfate, the whole is boiled for 4 hours, while stirring. After cooling, the separated dyestuff is filtered and washed. When dry it is a violet-brown powder, insoluble in water and in organic solvents. In concentrated sulfuric acid it forms an orange solution.

For producing complex zinc or cobalt or copper or aluminium or chromium compounds there is substituted for the nickel sulfate a compound yielding zinc or cobalt or copper or aluminium or chromium.

The dyestuff 16 in the table is made as follows:—

25 parts of Naphthochrome Azurine B are dissolved in 500 parts of water and the solution is mixed at 60° C. with a solution of 10.5 parts of crystallized cobalt sulfate, 5.6 parts of tartaric acid, 100 parts of water and 40 parts of caustic soda solution of 30 per cent. strength and the whole is heated on the water-bath at 70–75° C. for 4 hours. After cooling, the separated cobalt compound of the dyestuff is filtered and washed. When dry it is a blue powder, very sparingly soluble in water and in organic solvents but soluble in concentrated sulfuric acid to a reddish blue solution.

The dyestuff 24 in the table is made as follows:—

25 parts of Naphthochrome Green G are heated to boiling in 500 parts of water and, after addition of a solution alkaline with phenolphthalein of 7.1 parts of crystallized nickel sulfate, 3.73 parts of tartaric acid, 100 parts of water and 27 parts of caustic soda solution of 30 per cent. strength, the whole is boiled for 3 hours in a reflux apparatus. The nickel compound of the dyestuff, which has separated, is filtered, washed and dried at a moderate temperature. It is a dark green powder, very sparingly soluble in water or organic solvents and soluble in concentrated sulfuric acid to a greenish-grey-blue solution.

What we claim is:—

1. A fast-colored composition of matter consisting of a nitrocellulose lacquer and a complex metal compound of an unsulfonated arylmethane dyestuff which is sparingly soluble to insoluble in lacquer solvents.

2. A fast-colored composition of matter consisting of a nitrocellulose lacquer and a complex metal compound of an unsulfonated arylmethane dyestuff which is sparingly soluble to insoluble in lacquer solvents, the complexly bound metal being a member of the group consisting of titanium, vanadium, chromium, manganese, iron, cobalt, nickel, copper and zinc.

FRITZ STRAUB.
HANS MAYER.